Oct. 20, 1931.  R. L. BRUCE  1,828,520
SOLDERING CUP
Filed Nov. 2, 1929
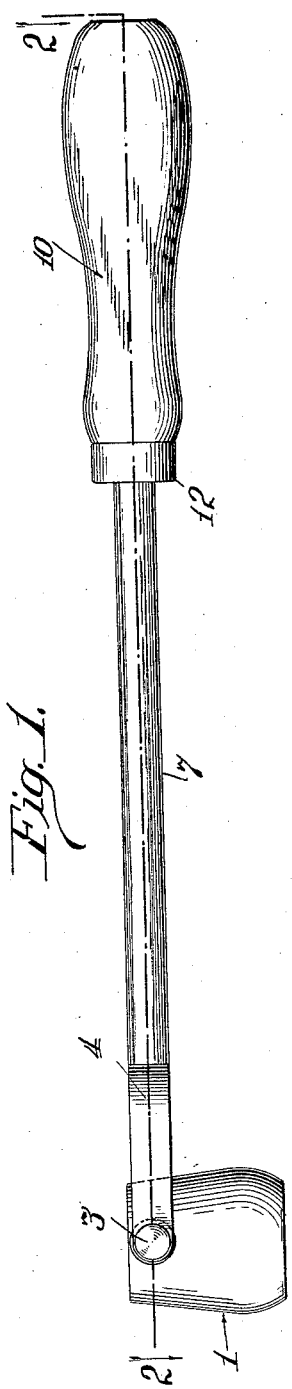
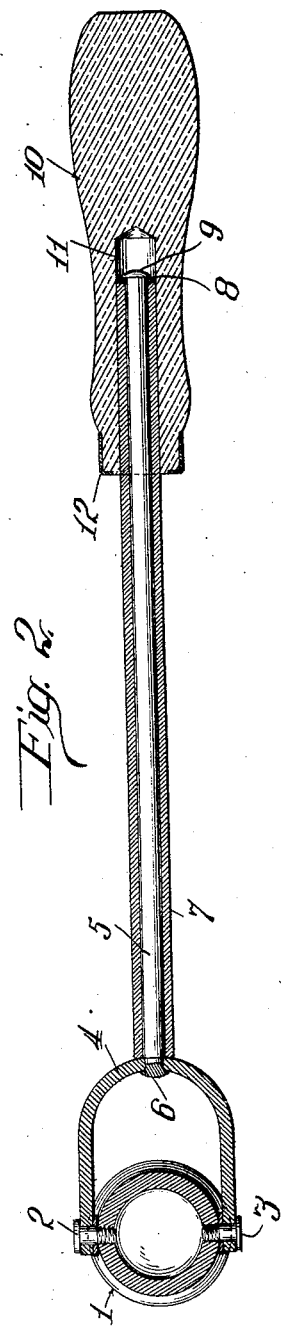
Inventor
Robert L. Bruce Patented Oct. 20, 1931

1,828,520

UNITED STATES PATENT OFFICE

ROBERT L. BRUCE, OF CHICAGO, ILLINOIS, ASSIGNOR TO WHITE BRASS CASTINGS COMPANY, A CORPORATION OF ILLINOIS

SOLDERING CUP

Application filed November 2, 1929. Serial No. 404,258.

This invention relates to soldering ladles and has for its principal object the production of a new and improved soldering ladle.

Soldering ladles comprising a cup pivoted to a U-shaped bracket which, in turn, is supported on the end of a handle, have long been employed by electricians to solder twisted ends of wires where the twist is made in a manner which permits it being dipped into a cup of molten solder. In the ladles used for this purpose heretofore, the cup containing the molten solder has been pivoted to the U-shaped bracket or stirrup, and the stirrup has been rigidly attached to the handle of the ladle. This construction permits the cup to swing in the stirrup to facilitate maintaining it upright as the ladle is moved to bring the solder into contact with the work that is to be soldered.

However, in a construction of this kind, when the cup is being advanced to a rather inaccessible place, it frequently happens that, due to a twisting motion of the operator's hand as the ladle is advanced, the cup will be tipped over sidewise and the molten solder spilled from it. This spilling of the solder not only delays the work, but frequently the solder so spilled falls on the operator, with the result that he is seriously burned thereby.

In my present invention I have provided a new and improved soldering ladle of this general type, one in which, in addition to supporting the cup rotatably in the stirrup, I have supported the stirrup rotatably on the handle so that, in effect, I have produced a universal joint which permits the cup of molten solder to be maintained upright while the ladle handle is being elevated and rotated as may be necessary to reach the work. This construction speeds up the work to be done by the soldering ladle, since the operator can advance it rapidly to any position with the full assurance that the cup containing the molten solder will remain upright and the solder will not be spilled from it.

I have also found it to be advantageous to limit the rotation of the cup about its pintles and have, therefore, provided a stirrup which registers with the cup in such a manner that the arc of rotation of the cup around its pintles is somewhat less than 360 degrees, the bottom edge of the cup striking the stirrup to limit this motion.

This arrangement facilitates bringing the molten solder into contact with the work under certain circumstances when the work is in an otherwise inaccessible place.

The improved cup, made in accordance with the teachings of my invention, is further advantageous in that the metal sleeve does not become hot enough to burn the hand of the workman when he is using the tool. The cup is pivotally supported in its stirrup and the stirrup is in turn pivoted to the handle, so that there are a plurality of breaks in the path that the heat must travel to reach the sleeve adjacent the handle of the tool. I have found in practice that when the solder in the cup is heated to the right temperature for soldering, the upper part of the metallic handle is cool enough to be handled without burning the workman. Even if the solder and cup containing it are overheated to redness, the upper part of the handle is not hot enough to burn the workman and cause him to drop the tool, although it is too warm to be handled comfortably. This heat insulation of the handle facilitates safe handling of it, and with the addition of a hard grip of insulating material makes the tool safe and convenient.

Now, to acquaint those skilled in the art with the teachings of my invention, reference is made to the accompanying drawings in which a preferred embodiment of it is shown by way of example, and in which:—

Figure 1 is an elevational view of my improved ladle; and

Figure 2 is a cross-sectional view of the ladle taken along the line 2—2 of Figure 1.

The ladle comprises the solder cup 1, which is preferably formed as a frustum of a right cone so that its bottom portion is somewhat larger than the upper portion. This cup is preferably made of cast iron, although other metal capable of withstanding the direct flame of a blow torch may be substituted as desired. It is customary in a ladle of this type to make the cup with a capacity of approximately one cubic inch, although the size of the cup may be varied to meet specific requirements within the teachings of my invention.

The cup 1 is provided with pintles 2 and 3 which are forced into opening into openings near its upper edge and which register with openings in the ends of a U-shaped stirrup 4, the pintles serving to support the cup in that stirrup.

The stirrup 4 is preferably made of steel of rectangular cross section, although other material and cross section shape may be employed as desired. In the preferred embodiment of my invention, the open end of the U stirrup closely embraces the outside of the cup at its smaller upper portion, and, as the cup is rotated about its pintles 2 and 3, its larger lower portion strikes against the U stirrup to limit the rotation of the cup. Obviously, if desired, the stirrup may be shaped in such a manner that the cup is free to rotate through a full circle, although I have found it advantageous to limit this rotation.

In the closed end of the U-shape stirrup, I have provided an opening through which the rod 5 tightly fits, the projecting end of that rod being riveted as at 6 to rigidly attach it to the stirrup. This rod 5 is disposed within a hollow tube 7, the diameter of the rod registering with the opening in the tube in such a manner as to permit its free rotation within the tube 7.

The rod 5 projects somewhat beyond the end of the tube 7 and the washer 8 is fitted around the rod and against the end of the tube. The end of the rod 5 projecting through the washer is riveted over to form the head 9, which prevents removal of the rod from the tube and, at the same time, permits its free rotation in the tube.

The handle 10 is provided with a cylindrical opening 11 into which the tube 7 is projected, this tube preferably fitting in the handle with a driving fit which rigidly holds the tube therein. The metallic collar 12 surrounds the end of the handle out of which the tubing 7 projects to prevent splintering of the handle 10 at this point. In the preferred embodiment of my invention, the handle 10 is constructed of wood, although fiber or a phenol condensation product may be substituted within the teachings of my invention.

The soldering ladle so constructed can be moved to any position with the full assurance that the cup 1 will always remain in an upright position. The cup pivots about its pintles 2 and 3 in the stirrup 4, and the stirrup pivots about the axis of the rod 5, that axis being disposed substantially at right angles to the axis of the pintles 2 and 3. The combined rotation about these two axes insures that the cup 1 will remain in an upright position at all times.

The provision of tightly riveting the rod 5 into the stirrup 4 and projecting the rod through the tube 7 insures that a rigid connection will be maintained between the rod and the stirrup, so that, although the stirrup is free to rotate about the rod, it does not wabble with respect thereto and the ladle is thereby made rigid without sacrificing its flexibility in any way. However, if it is desired to do so, the stirrup 4 may be fitted onto a shoulder disposed at the end of a solid rod which replaces the tubing 7 and the rod 5 and fastened thereon by riveting or in any other preferred manner.

However, I have found that this type of construction permits the stirrup 4 to wabble somewhat, and the ladle is, therefore, inferior to the type illustrated.

When the cup 1 is heated, the flames will also heat the stirrup 4 somewhat. Since the rod 5 is in good thermal contact with the stirrup, it likewise will be heated by conduction. The sleeve 7 however is in poor thermal contact with both the stirrup 4 and the rod 5, and as since heat must be radiated from the stirrup and rod to the sleeve, the sleeve does not get hot enough to burn the operator in the normal operation of the tool. Even if the cup 1 is heated red hot, the sleeve 7 adjacent the grip 10 will scarcely be hot enough to burn the hand of the workman.

Since the sleeve 7 does not get very hot, I am able to employ a wooden grip 10 without danger of burning the surface that engages the sleeve. The grip remains firmly seated on the sleeve and the danger of the handle coming off the tool is thereby eliminated.

While I have chosen to show a preferred embodiment of my invention, I have done so by way of example only, as there are many modifications and adaptations which can be made by one skilled in the art without departing from the teachings of the invention.

Having thus complied with the statutes and shown and described a preferred embodiment of my invention, what I consider new and desire to have protected by Letters Patent is pointed out in the appended claims.

What is claimed is:—

1. A soldering ladle in which the cup is pivotally supported in a stirrup and the stirrup rotatably supported on a handle to permit the cup to remain upright during movement of the handle in all directions.

2. In a soldering ladle, a cup-shaped substantially as a frustum of a right circular cone, a U-shaped stirrup, pintles projecting through said stirrup and engaging said cup to pivotally support it therein, the bottom of said cup striking said stirrup to limit the rotation of said cup, a handle for said ladle, and means for rotatably supporting said stirrup on said handle.

3. A soldering ladle comprising in combination, a wooden handle, a hollow metallic tube projecting therefrom, a rod disposed within said tube and projecting from the ends thereof, a head on said rod embracing the end of said tube within said handle, a U-shaped stirrup attached to said rod and embracing the free end of said tube, and a cup supported on pintles projected through the ends of said U-stirrup.

4. A soldering ladle comprising in combination, a wooden handle, a hollow metallic tube projecting therefrom, a rod disposed within said tube and projecting from the ends thereof, a U-shaped stirrup having a centrally located hole through which the end of said rod that projects from the free end of said tube is extended and its end riveted over to rigidly attach the stirrup to the rod, a washer surrounding the other projecting end of said rod, a head on the rod butting against said washer to hold the rod in the tube, and a cup supported in the open end of said stirrup by pintles extending through openings in the stirrup.

5. A soldering ladle comprising a metallic tube rigidly attached to and projecting from a heat insulating handle, a U-shaped stirrup attached to said metallic tube and free to rotate about the axis of it but definitely held against movement longitudinally of that axis, and a cup pivotally mounted in the open ends of said stirrup.

6. In a soldering ladle, the combination of a solder cup supported pivotally in a stirrup, a handle having a heat insulated grip, and means for rotatably attaching the stirrup to the handle.

7. A soldering ladle comprising a hollow metallic handle rigidly attached to and projecting from a non-metallic handle, a U-shaped stirrup, a rod connected thereto and in good thermal contact therewith, said rod projecting through said handle to attach the stirrup thereto in poor thermal contact therewith, and a cup pivotally supported in said stirrup.

In witness whereof, I hereunto subscribe my name this 26th day of October, 1929.

R. L. BRUCE.